(12) United States Patent
  Sigle

(10) Patent No.: US 11,285,878 B2
(45) Date of Patent: Mar. 29, 2022

(54) VEHICLE VISION SYSTEM WITH CAMERA LINE POWER FILTER

(71) Applicant: MAGNA ELECTRONICS INC., Auburn Hills, MI (US)

(72) Inventor: Marc-Andrè Sigle, Alzenau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 912 days.

(21) Appl. No.: 15/379,800

(22) Filed: Dec. 15, 2016

(65) Prior Publication Data

US 2017/0174131 A1   Jun. 22, 2017

Related U.S. Application Data

(60) Provisional application No. 62/268,742, filed on Dec. 17, 2015.

(51) Int. Cl.
  *B60R 1/00* (2006.01)
  *H04N 5/225* (2006.01)
  *H04N 5/232* (2006.01)
  *H04N 7/18* (2006.01)
  *B60R 1/12* (2006.01)

(52) U.S. Cl.
  CPC ............... *B60R 1/12* (2013.01); *H04N 7/181* (2013.01)

(58) Field of Classification Search
  CPC ... H04N 5/2251; H04N 5/23241; H04N 5/228
  See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,690,268 B2 | 2/2004 | Schofield et al. | |
| 6,757,109 B2 | 6/2004 | Bos | |
| 7,965,336 B2 | 6/2011 | Bingle et al. | |
| 8,503,061 B2 | 8/2013 | Uken et al. | |
| 8,542,451 B2 | 9/2013 | Lu et al. | |
| 8,866,907 B2 | 10/2014 | McElroy et al. | |
| 9,233,641 B2 | 1/2016 | Sesti et al. | |
| 9,609,757 B2 | 3/2017 | Steigerwald | |
| 2006/0125919 A1* | 6/2006 | Camilleri ............... | H04N 7/183 348/148 |
| 2009/0152943 A1* | 6/2009 | Diab ...................... | B60R 16/023 307/10.1 |
| 2011/0193961 A1* | 8/2011 | Peterson ................ | H04N 7/183 348/148 |
| 2012/0154591 A1* | 6/2012 | Baur ........................ | B60R 1/00 348/148 |

(Continued)

*Primary Examiner* — Mainul Hasan
(74) *Attorney, Agent, or Firm* — Honigman LLP

(57) ABSTRACT

A vision system of a vehicle includes a camera configured to be disposed at a vehicle so as to have a field of view interior or exterior of the vehicle. An image processor is operable to process image data captured by the camera. The camera is connected to a system of the vehicle via an image data transmission line. The image data transmission line transmits an image signal from the camera and provides a power signal to the camera. The image data transmission line includes a filter that filters electrical noise in at least one signal, such as the power signal, carried by the image data transmission line.

14 Claims, 4 Drawing Sheets

(56) References Cited

U.S. PATENT DOCUMENTS

| | | | |
|---|---|---|---|
| 2013/0033599 A1* | 2/2013 | Dayan | B60K 35/00 348/148 |
| 2013/0194381 A1* | 8/2013 | McMahon | B60W 30/143 348/36 |
| 2013/0222595 A1 | 8/2013 | Gebauer et al. | |
| 2013/0242099 A1 | 9/2013 | Sauer et al. | |
| 2013/0314503 A1 | 11/2013 | Nix et al. | |
| 2013/0321632 A1* | 12/2013 | Nix | H04N 5/268 348/148 |
| 2013/0328672 A1 | 12/2013 | Sesti et al. | |
| 2013/0344736 A1 | 12/2013 | Latunski | |
| 2014/0138140 A1 | 5/2014 | Sigle | |
| 2014/0152778 A1 | 6/2014 | Ihlenburg et al. | |
| 2014/0218535 A1 | 8/2014 | Ihlenburg et al. | |
| 2014/0313339 A1* | 10/2014 | Diessner | H04N 7/18 348/148 |
| 2014/0320636 A1 | 10/2014 | Bally et al. | |
| 2014/0362209 A1 | 12/2014 | Ziegenspeck et al. | |
| 2014/0373345 A1 | 12/2014 | Steigerwald | |
| 2015/0042807 A1 | 2/2015 | Ihlenburg et al. | |
| 2015/0062342 A1* | 3/2015 | Hoek | B60R 1/04 348/148 |
| 2015/0222795 A1 | 8/2015 | Sauer et al. | |
| 2015/0266430 A1 | 9/2015 | Mleczko et al. | |
| 2015/0365569 A1 | 12/2015 | Mai et al. | |
| 2016/0037028 A1 | 2/2016 | Biemer | |
| 2017/0188467 A1 | 6/2017 | Steigerwald | |
| 2017/0295352 A1 | 10/2017 | Ihlenburg et al. | |

* cited by examiner

VEHICLE VISION SYSTEM WITH CAMERA LINE POWER FILTER

CROSS REFERENCE TO RELATED APPLICATION

The present application claims the filing benefits of U.S. provisional application Ser. No. 62/268,742, filed Dec. 17, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides power to the camera or cameras via an Ethernet, LVDS or any other discrete or analog connection line (referred to herein as a connection line or image data transmission line), with the transmission line having a noise filter that filters noise from the signal or signals (such as a power signal) carried or communicated or transmitted by the transmission line.

The noise filter may comprise a-filter built of inductivities, capacitors, ferrets or any other passive form of active filter component disposed in line with a DC/DC converter that converts the supplied power for the camera. The camera may comprise the image processor or the image processor may be disposed remote from the camera. The video connection communicates data captured by the camera and/or communicates a control signal to the camera.

Thus, the camera is connected to a system of the vehicle via a transmission line, and the transmission line provides power to the camera and includes a noise filter that filters noise in the combined power and data signal of the transmission line.

Data transmitted between the camera and receiving ECU on the transmission line (with data transmitted in either one or both of the two directions) may be disturbed by the noise generated by either the camera or the receiving device. The filter keeps noise away from the transmission line, and thus increases the signal to noise ratio.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and process the image data to detect objects present in the field of view of the camera and/or to provide an output to a display device for displaying images representative of the captured image data. Optionally, the vision system may provide display, such as a rearview display or a top down or bird's eye or surround view display or the like.

Figure 1:
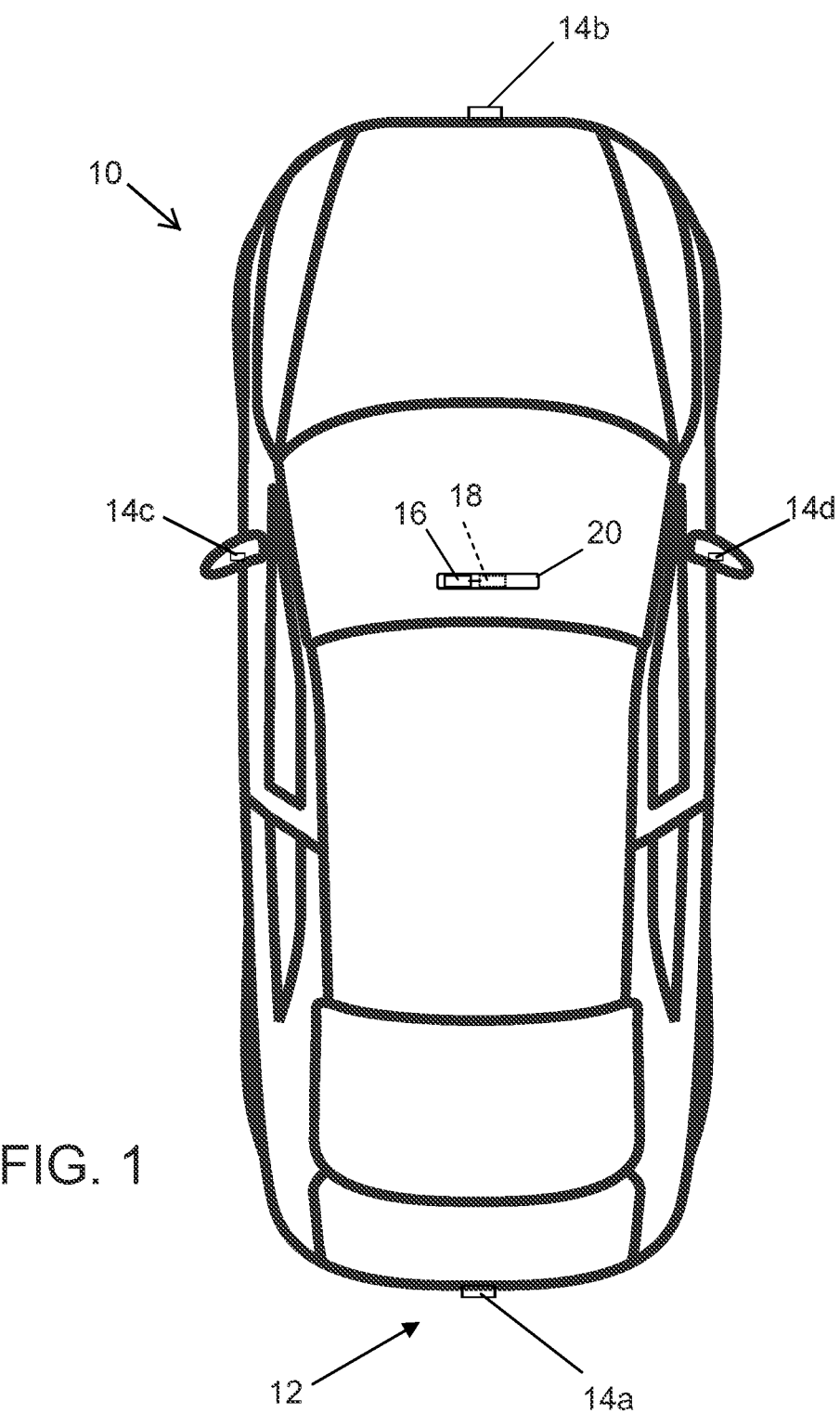
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The vehicle camera is connected to a processor or system of the vehicle by a transmission line, which also features power over cable (also known in variants as Power over Coax—PoC or Power over Ethernet—PoE). Typical power over cable solutions without an additional noise filter on the DC/DC power supply of the camera suffer from noise back-fed through, or even generated by, the power supply.

Figure 2:
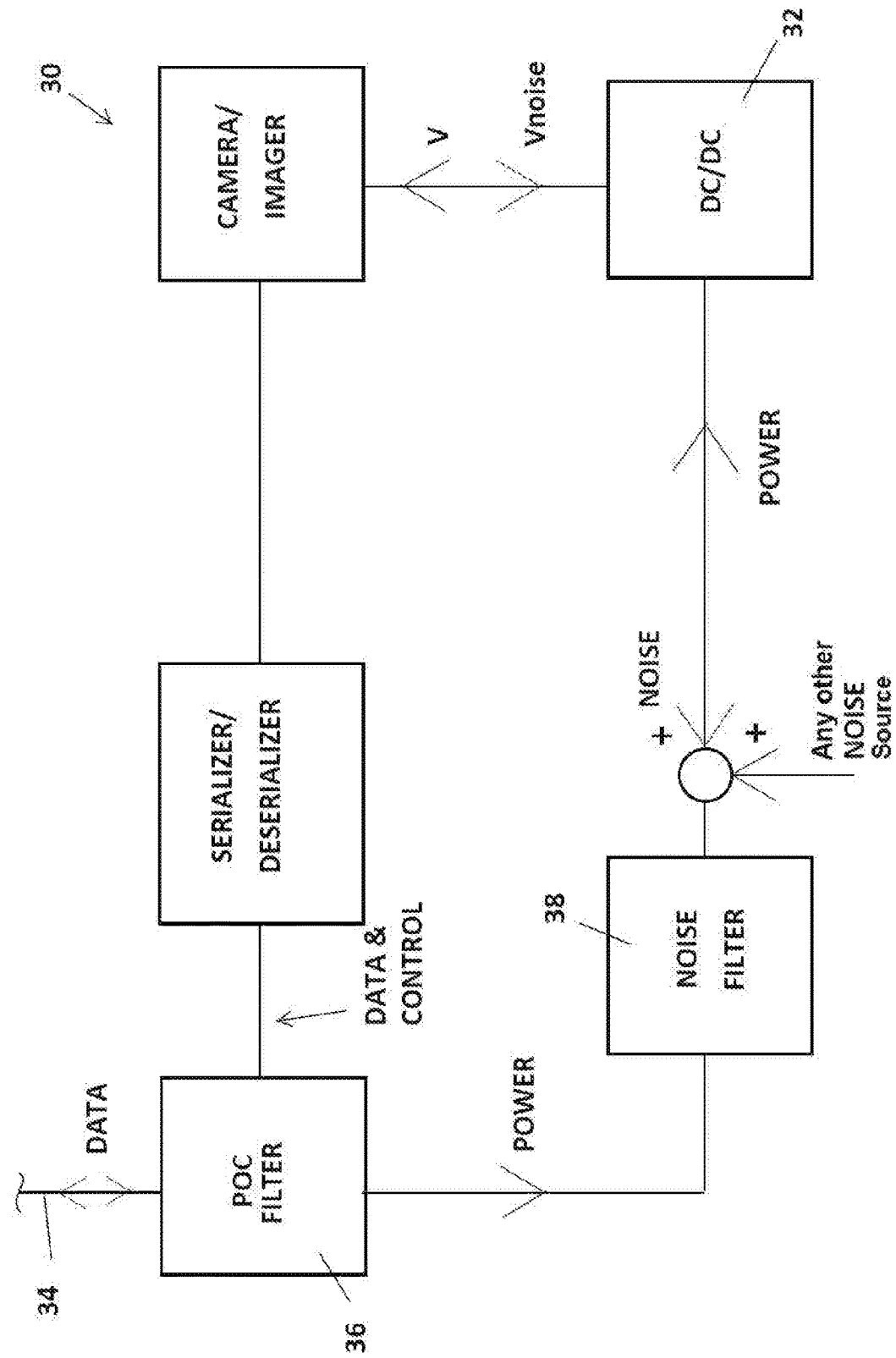
FIG. 2 is a block diagram showing the vision system and camera line power/noise filter in accordance with the present invention.

As shown in FIG. 2, the vision system or camera system of the present invention includes a camera 30 (which may be an interior viewing or exterior viewing camera disposed at the vehicle) having an imager (optionally with an image processor) and a switching or linear regulator—in the following referred to as DC/DC converter 32 that is connected to a transmission line cable 34 that provides power (POC 36) to the converter 32 and provides and/or receives data from the imager of the camera 30. As shown in FIG. 2, the present invention adds a noise filter 38 in front of the line power input port of the camera's primary DC/DC converter 32, and thus the camera supply current noise can be reduced.

The data or signal transmission line of the system of the present invention is at least capable of transmitting high definition image data captured by a vehicle camera. The image data transmission line is also operable to carry electrical power to the vehicle camera from a power source of the vehicle (such as, for example, an electronic control unit (ECU) of the vehicle that image processes image data transmitted to that ECU from at least one camera via such an image data transmission line). For example, such an image data transmission line operable to also carry electrical power/voltage can be a power over coax—PoC image data transmission line/cable or can be a power over Ethernet—PoE image data transmission line/cable.

Figure 3:
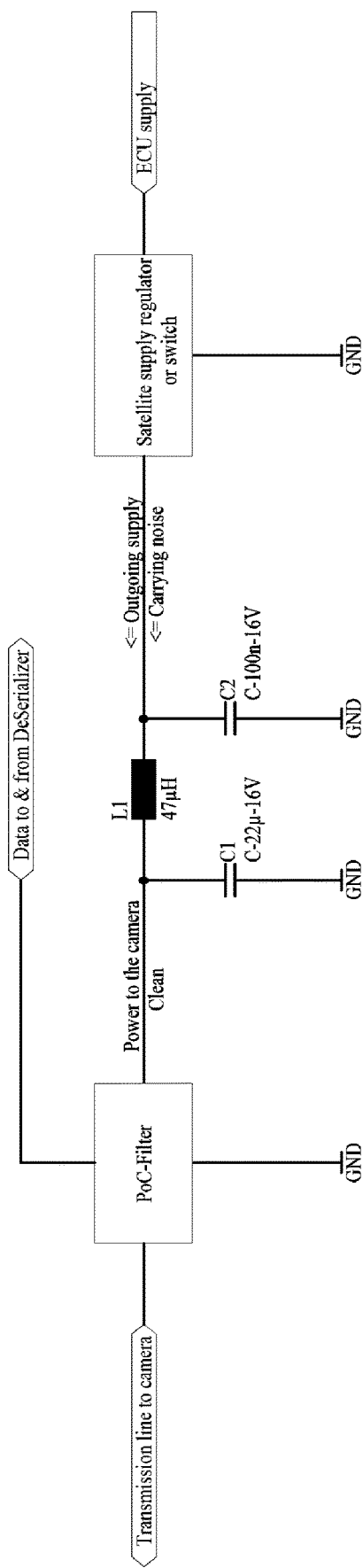
FIG. 3 is a block and circuit diagram showing the vision system and camera line power/noise filter in accordance with the present invention, with the noise filter realized by passive circuit elements.
Figure 4:
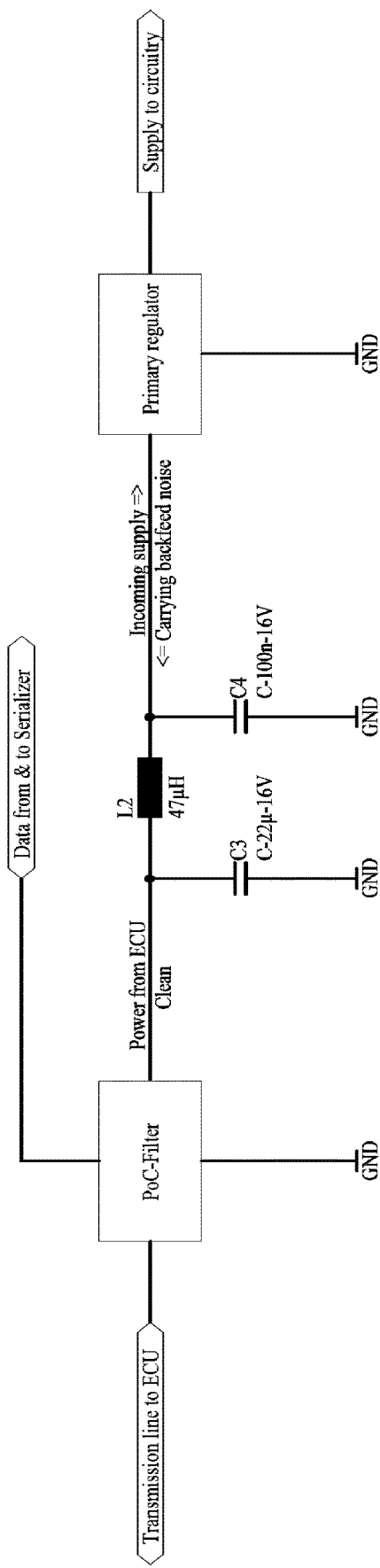
FIG. 4 is a block and circuit diagram showing the vision system and camera line power/noise filter in accordance with the present invention, with the noise filter realized by passive circuit elements.

The noise filter 38 may, in a simple form, comprise an electronic filtering circuit (comprising any passive components, such as, for example, inductors, capacitors, ferrets or resistors connected together) such as shown in FIGS. 3 and 4, or may comprise any active filter or even a combination of both.

The noise filter's parameters can be adapted to a noise that is known to be generated in the camera or ECU, or to the communication channel parameters (such as, for example, frequencies, bands or the like) that are used to do the actual communication.

Optionally, the quality or complexity of the DC/DC converter can be diminished which makes it less costly while achieving a comparable noise level on the output. A less complex DC/DC converter may do without a noise blocker or shunt loop control.

Optionally, a less expensive or complex data and power supply line or a line with more connector intersections or a longer line can be used, when a noise filter in front of the line power input port of the camera DC/DC converter is in use.

Therefore, the present invention provides a noise filter along the power feed to the camera (with the power provided via an image data transmission line cable that connects a camera to a vehicle system to control the camera and/or to feed data captured by the camera to a processor or system of the vehicle that is remote from the camera). The noise filter reduces supply voltage noise in the signal to the camera and the ECU, which enhances the signal to noise ratio, and thus leads to enhanced transmission distance capability and/or offers the possibility to use lower energy to transmit the data, possibly improving EMC emission. The image data captured by the camera may be processed by an image processor at the camera (where processed data or information is communicated or transmitted by the transmission line to a control unit or system of the vehicle) or by a processor remote from the camera (where the captured image data is communicated or transmitted to the processor via the transmission line or link).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

The system may include an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

a camera disposed at a vehicle and having a field of view interior or exterior of the vehicle, wherein the camera is operable to capture image data;

an electronic control unit (ECU) disposed at the vehicle remote from said camera, wherein said ECU comprises an image processor operable to process image data captured by said camera;

wherein said camera is connected to said ECU via an image data transmission line, and wherein said image data transmission line comprises a power-over-coaxial cable or a power-over-Ethernet cable;

wherein said image data transmission line (i) transmits image data captured by said camera from said camera to said ECU for processing by said image processor and (ii) delivers electrical power from said ECU to said camera for powering said camera; and wherein said image data transmission line comprises a filter that filters electrical noise arising from electrical power delivered by said image data transmission line to said camera.

2. The vision system of claim 1, wherein said filter comprises a filtering circuit disposed between said camera and said ECU in line with a linear voltage regulator.

3. The vision system of claim 1, wherein said filter comprises a filtering circuit disposed between said camera and said ECU in line with a DC/DC converter.

4. The vision system of claim 3, wherein said DC/DC converter is disposed between said camera and said filter.

5. The vision system of claim 1, wherein said filter is disposed between a regulator at said ECU and said camera.

6. The vision system of claim 1, wherein said image data transmission line communicates a control signal from said ECU to said camera.

7. The vision system of claim 1, comprising a display disposed in the vehicle and viewable by a driver of the vehicle, wherein said display displays images derived from image data captured by said camera and transmitted via said image data transmission line from said camera to said ECU.

8. The vision system of claim 1, wherein said filter filters electrical noise in the image data transmitted by said image data transmission line from said camera to said ECU.

9. A vision system of a vehicle, said vision system comprising:
- a camera disposed at a vehicle and having a field of view interior or exterior of the vehicle, wherein the camera is operable to capture image data;
- an electronic control unit (ECU) disposed at the vehicle remote from said camera, wherein said ECU comprises an image processor operable to process image data captured by said camera;
- wherein said camera is connected to said ECU via an image data transmission line, and wherein said image data transmission line comprises a power-over-coaxial cable or a power-over-Ethernet cable;
- wherein said image data transmission line (i) transmits image data captured by said camera from said camera to said ECU for processing by said image processor and (ii) delivers electrical power from said ECU to said camera for powering said camera;
- wherein said image data transmission line comprises a filter that filters electrical noise arising from electrical power delivered by said image data transmission line to said camera; and wherein said filter comprises a filtering circuit disposed between said camera and said ECU in line with at least one of (i) a linear voltage regulator and (ii) a DC/DC converter.

10. The vision system of claim 9, wherein said filter filters electrical noise in the image data carried by said image data transmission line to said ECU.

11. The vision system of claim 9, comprising a display disposed in the vehicle and viewable by a driver of the vehicle, wherein said display displays images derived from image data captured by said camera and transmitted via said image data transmission line from said camera to said ECU.

12. A vision system of a vehicle, said vision system comprising:
- a camera disposed at a vehicle and having a field of view interior or exterior of the vehicle, wherein the camera is operable to capture image data;
- an electronic control unit (ECU) disposed at the vehicle remote from said camera, wherein said ECU comprises an image processor operable to process image data captured by said camera;
- wherein said camera is connected to said ECU via an image data transmission line, and wherein said image data transmission line comprises a power-over-coaxial cable or a power-over-Ethernet cable;
- wherein said image data transmission line (i) transmits image data captured by said camera from said camera to said ECU for processing by said image processor and (ii) delivers electrical power from said ECU to said camera for powering said camera;
- wherein said image data transmission line communicates a control signal from said ECU to said camera;
- wherein said image data transmission line comprises a filter that filters electrical noise arising from electrical power delivered by said image data transmission line to said camera; and
- a display disposed in the vehicle and viewable by a driver of the vehicle, wherein said display displays images derived from image data captured by said camera and transmitted via said image data transmission line from said camera to said ECU.

13. The vision system of claim 12, wherein said filter comprises a filtering circuit disposed between said camera and said ECU in line with a linear voltage regulator.

14. The vision system of claim 12, wherein said filter comprises a filtering circuit disposed between said camera and said ECU in line with a DC/DC converter.

\* \* \* \* \*